United States Patent [19]

Fling et al.

[11] Patent Number: 4,558,351
[45] Date of Patent: Dec. 10, 1985

[54] HUE CORRECTION CIRCUIT FOR A DIGITAL TV RECEIVER

[75] Inventors: Russell T. Fling, Noblesville; Donald H. Willis, Indianapolis, both of Ind.

[73] Assignee: RCA Corporation, Princeton, N.J.

[21] Appl. No.: 554,083

[22] Filed: Nov. 21, 1983

[51] Int. Cl.$^4$ .............................................. H04N 9/535
[52] U.S. Cl. .................................... 358/28; 358/21 R
[58] Field of Search .......................... 358/21 R, 27, 28; 364/766, 767

[56] References Cited

FOREIGN PATENT DOCUMENTS 0071506 2/1983 European Pat. Off. .

OTHER PUBLICATIONS

Ser. No. 487,084, filed 4/21/83 "Auto Flesh Circuitry as for a Digital TV Receiver", Kao (RCA 79,481).
Ser. No. 501,896, filed 6/7/83 "An Auto Tint Circuit for a TV Receiver", Chin (RCA 79,489).
Ser. No. 487,082, filed 4/21/83 "Manual Hue Control as for a Digital TV", Harwood (RCA 77,627).

*Primary Examiner*—Michael A. Masinick
*Attorney, Agent, or Firm*—E. M. Whitacre; P. J. Rasmussen; E. P. Herrmann

[57] ABSTRACT

A digital hue correction circuit for correcting the color of digital TV chrominance signals includes a pipelined divider arranged to divide the smaller of the magnitudes of I and Q color mixture signals by the larger of the magnitudes of the I and Q signals to produce quotients representing tangents over the range of zero to 45 degrees for chrominance angles occurring over the range of zero to 360 degrees. The polarity bits of the I and Q signals and the polarity bit of the difference of the magnitudes of I-Q are encoded to transpose the zero to 45 degree angle tangent values over the range of zero to 360 degree angles. The transposed tangent values address a memory programmed with all negative hue correction coefficients representing the sines and cosines of angles by which the chrominance vector is to be rotated to effect hue correction. The I and Q signals and the hue correction coefficients are applied to a complex multiplier to produce corrected I and Q color mixture signals I' and Q' according to the equations $I' = I \cos \Delta\phi \pm Q \sin \Delta\phi$ $Q' = Q \cos \Delta\phi \mp I \sin \Delta\phi$.

14 Claims, 8 Drawing Figures

Fig. 3

| SAMPLE TIME | $T_1,\phi_1$ | $T_2,\phi_2$ | $T_3,\phi_3$ | $T_4,\phi_4$ | $T_5,\phi_1$ | $T_6,\phi_2$ | $T_7,\phi_3$ | $T_8,\phi_4$ |
|---|---|---|---|---|---|---|---|---|
| | $I_n$ | | $Q_n$ | | $I_{n+1}$ | | $Q_{n+1}$ | |
| A | $I_n$ | | | | $I_{n+1}$ | | | |
| B | $Q_{n-1}$ | | $Q_n$ | | | | $Q_{n+1}$ | |
| C | $Q_{n-1}/I_{n-1}$ | | $Q_n/I_n$ | | | | $Q_{n+1}/I_{n+1}$ | |
| D | SIN n-1 | | | SIN n | | | | SIN n+1 |
| E | COS n-1 | | | COS n | | | | COS n+1 |
| F | $I_{n-1}$ | | $I_n$ | | | | $I_{n+1}$ | |
| G | $Q_{n-1}$ | | | | $Q_n$ | | | |
| H | $Q_{n-1}$ | $I_{n-1}$ | $Q_{n-1}$ | $I_n$ | $Q_n$ | $I_n$ | $Q_n$ | $I_{n+1}$ |
| J | $SIN_{n-1}$ | $SIN_{n-1}$ | $COS_{n-1}$ | $COS_n$ | $SIN_n$ | $SIN_n$ | $COS_n$ | $COS_{n+1}$ |
| K | $I_{n-1} \times COS_{n-1}$ | $Q_{n-1} \times COS_{n-1}$ | $-I_{n-1} \times SIN_{n-1}$ | $Q_{n-1} \times COS_{n-1}$ | $I_n \times COS_n$ | $Q_n \times SIN_n$ | $-I_n \times SIN_n$ | $Q_n \times COS_n$ |
| L | $Q_{n-2} \times COS_{n-2}$ | $I_{n-1} \times COS_{n-1}$ | $Q_{n-1} \times SIN_{n-1}$ | $-I_{n-1} \times SIN_{n-1}$ | $Q_{n-1} \times COS_{n-1}$ | $I_n \times COS_n$ | $Q_n \times SIN_n$ | $-I_n \times SIN_n$ |
| M | * | $Q_{n-1} SIN + I_{n-1} COS$ | * | $Q_{n-1} COS - I_{n-1} SIN$ | * | $Q_n SIN + I_n COS$ | * | $Q_n COS - I_n SIN$ |

ARGUMENTS OF $SIN_i, COS_i$ ARE $\Delta\phi_i$

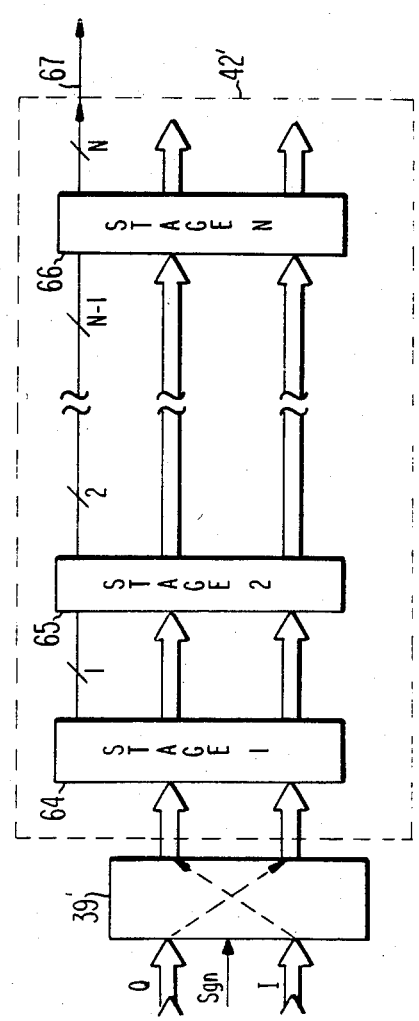
Fig. 4B
Fig. 5
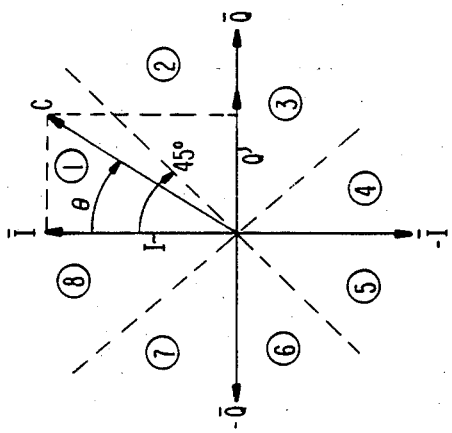
Fig. 4A

| TIME | STAGE | DIVIDEND INPUT | 2 X DIVIDEND | DIVIDEND OUTPUT | DIVISOR | DIFFERENCE | SIGN | QUOTIENT |
|---|---|---|---|---|---|---|---|---|
| $T_1$ | 1 | 0010 | 00100 | 0100 | 1110 | 10110 | 0 | 0 |
| $T_2$ | 2 | 0100 | 01000 | 1000 | 1110 | 11010 | 0 | 00 |
| $T_3$ | 3 | 1000 | 10000 | 0010 | 1110 | 00010 | 1 | 001 |
| $T_4$ | 4 | 0010 | 00100 | 0100 | 1110 | 10110 | 0 | 0010 |
| $T_5$ | 5 | 0100 | 01000 | 1000 | 1110 | 11010 | 0 | 00100 |
| $T_6$ | 6 | 1000 | 10000 | 0010 | 1110 | 00010 | 1 | 001001 |

HUE CORRECTION CIRCUIT FOR A DIGITAL TV RECEIVER

BACKGROUND OF THE INVENTION

The present invention relates to apparatus for performing hue correction in a digital television receiver.

Hue control in a digital television environment may be performed in a variety of ways. If the sampling clock is phase/frequency locked with the color burst, hue control may be accomplished by adjusting the phase of the sampling clock relative to the phase of the color burst. In this situation phase adjustment may be automatically controlled in response to detecting a chrominance angle signal. An alternate approach is to operate on the chrominance samples directly. For example, the magnitude and angle of the chrominance signal may be generated, the angles modified by correction factors related to the instantaneous chrominance angles, and the magnitude samples multiplied by the sines and cosines of the corrected angles to generate corrected I, (R-Y) and Q, (B-Y) color mixture signals.

A second approach to correcting hue by processing chrominance samples is to develope signals corresponding to the instantaneous phase of the chrominance samples, and in response to these developed signals to generate correction factors representing $\sin \Delta\phi$ and $\cos \Delta\phi$ where $\Delta\phi$ is the phase change required to produce the desired hue correction. The color mixture signals are then multiplied by the correction factors and the sums of products are formed which correspond to corrected color mixture signals. The sums of products are given by the equations $$I_n' = I_n \cos \Delta\phi_n + Q_n \sin \Delta\phi_n \quad (1)$$

$$Q_n' = Q_n \cos \Delta\phi_n - I_n \sin \Delta\phi_n \quad (2)$$

where $I_n'$, $Q_n'$ are corrected samples for the instantaneous color mixture signals $I_n$ and $Q_n$ respectively.

SUMMARY OF THE INVENTION

The present invention is a hue correction circuit of the lattermost described type realized with simplified digital apparatus for producing continuous hue correction. The apparatus consists of a pipelined divider circuit arranged to always divide the magnitudes of the smaller of the color mixture signals by the larger color mixture signal to generate quotients corresponding to the tangents of angles over the range of zero to 45 degrees. Alternatively the divider may always divide the larger color mixture signal by the smaller. A control signal indicative of which of the color mixture signals is larger/smaller, and the sign bits of the color mixture signals are decoded to produce a three bit code to relate the zero to 45 degree tangents over the zero to 360 degree range of the chrominance phasor. The code word is combined with the quotients and applied as address codes to a memory element. The memory element is programmed to produce correction factors, $\sin \Delta\phi$ and $\cos \Delta\phi$, for the chrominance phasor angles represented by the applied address codes. A multiplier circuit is arranged to multiply the applied color mixture signals by the correction factors. An adder circuit responsive to the products, forms the sums of products in accordance with equations (1) and (2) to produce hue corrected color mixture signals.

BRIEF DESCRIPTION OF THE DRAWINGS

FIG. 3 is a table of samples indicating the sample values occurring at different points of the FIG. 2 circuit;

FIGS. 4A and 4B are a phasor diagram and table of logic values describing the chrominance vector in terms of I and Q color mixture signals;

FIGS. 5 and 6 are a block diagram and logic schematic of a pipelined divider circuit for use in the FIG. 2 apparatus; and FIG. 7 is a table of values generated at various stages of a six stage pipelined divider of the type illustrated in FIG. 6 for an exemplary division of two by fourteen.

DETAILED DESCRIPTION OF THE INVENTION

Composite video signal includes a luminance and a chrominance component. The chrominance component contains color information. It is an amplitude and phase modulated sinusoid and as such is defined as a phasor. Processing of the chrominance component, in a digital video system, is usually performed on a pair of quadrature related color mixture (or color difference) signals, the vector sum of which corresponds to the chrominance signal. Thus, in the digital video processing context, the chrominance signal may be considered to be a vector. In the following description, the terms vector and phasor are used interchangeably regarding the chrominance signal.

Figure 1:
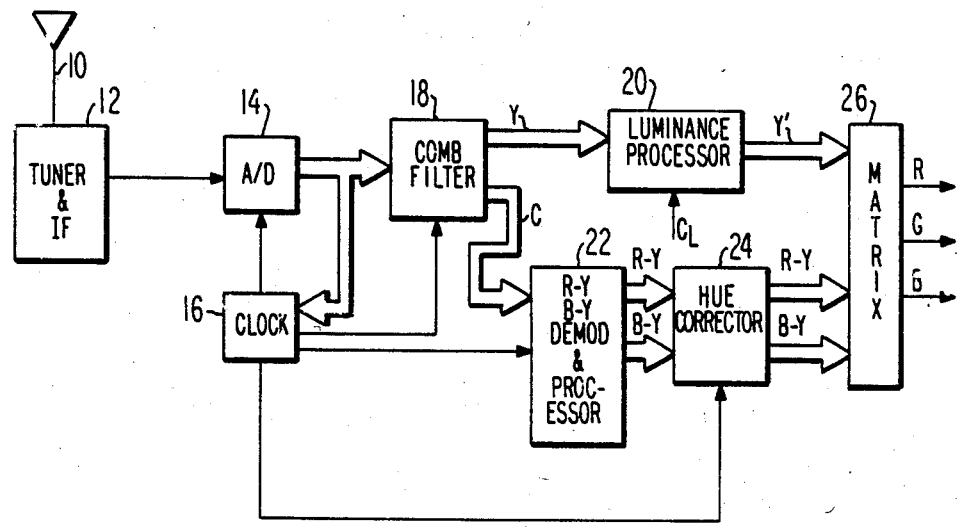
FIG. 1 is a block diagram of a digital television receiver including a hue correction circuit.

FIG. 1 is a block diagram of a digital TV receiver showing the basic processing blocks including a hue correction circuit. A standard television signal, e.g., NTSC, is received by antenna 10 and applied to conventional analog tuning and intermediate frequency circuits 12. Baseband composite signal from element 12 is applied to the analog input terminal of an analog-to-digital converter 14 which is controlled by the clock generator circuit 16 to sample the signal at four times the color subcarrier frequency. The analog-to-digital converter preferably produces binary samples in e.g., pulse code modulated (PCM) two's complement format at the sample rate. The PCM samples are applied to the clock generator circuit 16 wherein the sampling signal is phase locked with the color burst reference component of the composite signal. Clock generator 16 also generates the requisite clock signals to synchronously operate the remaining digital processing circuits.

The PCM signals from the analog-to-digital converter are also applied to a comb filter 18 wherein the luminance component, Y, and the chrominance component, C, of the composite signal are separated. The luminance component is applied to the luminance processing element 20 wherein it is appropriately conditioned for application to the color matrix circuit 26. The chrominance component is applied to element 22 in which it is filtered, processed and demodulated into color mixture components I and Q or (R-Y) and (B-Y). The processed color mixture signals from element 22 are applied to the hue correction circuit 24, which may be a manual hue control or an automatic fleshtone correction circuit. Hue control circuit 24 corrects color distortions by effectively rotating the chrominance vector by altering the (R-Y) and (B-Y) components. The corrected vector has corrected component signals (R-Y)' and (B-Y)', or the I' and Q'. These corrected components are applied to the matrix 26 where they are combined with the processed luminance samples Y' to generate RGB color signals to drive the display tube.

Figure 2:
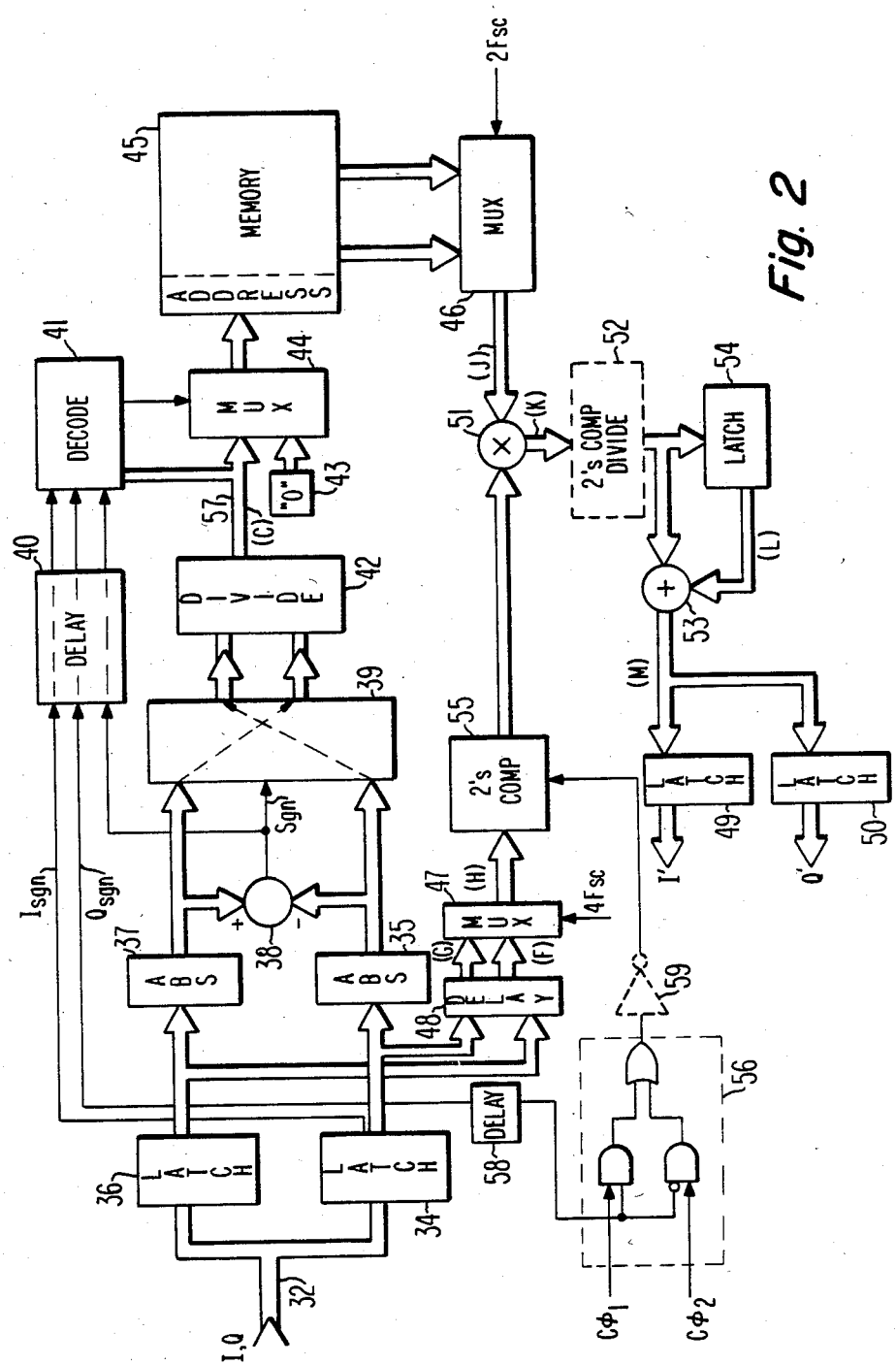
FIG. 2 is a logic schematic of an automatic hue correction apparatus embodying the present invention.

FIG. 2 is a representative hue control circuit of the type which may be employed for element 24 in FIG. 1. The operation of the FIG. 2 circuit will be described with reference to FIG. 3. I and Q color mixture signals, rather than (R-Y) and (B-Y) color mixture signals are used in the description to simplify the notation of FIG. 3 but the operation of the circuit is basically the same for both sets of quadrature-related color mixture signals.

Color information is contained in the angle of the vector or phasor defined by the vector sum of the I and Q color mixture signals relative to a fixed reference determined by the phase of the color burst. It can be shown that the chrominance phasor may be rotated, relative to burst, by an amount equal to the angle $\Delta\phi$ by forming the sums of products $$I' = I\cos\Delta\phi \pm Q\sin\Delta\phi \quad (1)$$

$$Q' = Q\cos\Delta\phi \pm I\sin\Delta\phi \quad (2)$$

where I' and Q' are the magnitudes of the quadrature related color mixture signals representing the rotated chrominance vector. For a (+) sign in equation (1) and a (−) in equation (2), for positive correction factors equations (1) and (2) produce a counter clockwise rotation of the vector. With (−) and (+) signs respectively in equations (1) and (2), the sums produce clockwise vector correction rotation for positive correction factors.

For manual hue control the values $\Delta\phi$ are the same for all values of the chrominance phasor angles. For auto flesh correction the chrominance vector is rotated different amounts depending on the instantaneous chrominance angle. Typically auto flesh correction is performed for chrominance vector angles in the range of ±90 degrees from the I axis with a maximum correction being applied for the instantaneous chrominance vector residing near +45 degrees from the I axis.

To be able to perform auto flesh correction the instantaneous value of the angle of the vector sum of I and Q, or a signal related to the instantaneous angle, must be determined at a rate commensurate with the video bandwidth. A convenient reference angle is the angle between the chrominance vector and the I axis since the I axis is typically associated with normal flesh tones. This angle is equal to the arctangent of the magnitude of Q divided by the magnitude of I. However, it is unnecessary to calculate the arctangent since the required angle information can be extracted from the quotient defined by Q/I.

The instantaneous quotients Q/I can be applied to the address input of a memory device, e.g., a ROM, programmed to produce the appropriate correction factors, sin $\Delta\phi$ and cos $\Delta\phi$, for the chrominance angle related to the instantaneous quotient. The instantaneous I and Q color mixture signals are then multiplied by these factors and the sums defined by equations (1) and (2) are produced.

By appropriately phasing the four-times subcarrier sampling clock applied to the A/D converter 14, the sequence of consecutive chrominance samples output by the comb filter 18 will be of the form $I_n$, $Q_n$, $-I_n$, $-Q_n$, $I_{n+1}$, $Q_{n+1}$, $-I_{n+1}$, $-Q_{n+1}$ etc. where the samples include magnitude and polarity information. Note, the signs associated with the respective samples in the sequence do not indicate the polarity of the samples but rather phase of the sampling clock. The $\pm I_n$ and $Q_n$ samples may be either polarity. The necessary information to reproduce all the color information is contained equally in both the positive and negative sample values. It is convenient and efficient to process only half of the available samples and it will be presumed that only the +I and +Q samples are applied to the FIG. 2 circuit. The sequence of +I and +Q samples represent demodulated, interleaved color difference signals. The demodulated sequence of I, Q samples is illustrated by the (I, Q) sample sequence of FIG. 3 which sequence is applied to bus 32 in FIG. 2. The I samples are latched in element 34 which produces the demodulated I sample sequence (A) in FIG. 3 and the Q samples are latched in element 36 which produces the demodulated Q sample sequence, (B), in FIG. 3. The sample sequences (A) and (B) are respectively applied to the absolute value circuits 35 and 37 which pass only the magnitudes of the applied samples. Samples from absolute value circuit 37 are applied as minuends to subtraction circuit 38 and samples from absolute value circuit 35 are applied as subtrahends to subtraction circuit 38 which generates signal samples corresponding to the difference of the applied samples. The sign bit of the difference is indicative of which sample I or Q is larger. For two's complement subtraction the sign bit is a logic zero for positive differences (Q>I) and a logic one for negative differences (Q<I).

The I and Q samples from absolute value circuits 35 and 37 are applied to switching circuit 39 and the sign bit from subtraction circuit 38 is applied to a control terminal of circuit 39. In response to the control signal switching circuit 39 always directs the larger of the I, Q samples to the divisor input port of pipeline divider circuit 42 and the smaller of the I, Q samples to the dividend input of divider circuit 42. Alternatively, the smaller of the samples may be applied to the divisor input port and the larger to the dividend input port. In the former case, the divider calculates values corresponding to the tangent defined by Q/I over a 45 degree range from the I axis, and in the latter, the divider 42 calculates the cotangent. Divider circuit 42 operates synchronously at the I, Q sample rate to generate the sequence of quotients illustrated by (C) in FIG. 3. The instantaneous quotients are applied as address signals to memory element 45 which produces the appropriate angle correction factors sin $\Delta\phi$ and cos $\Delta\phi$ for the chrominance vector angle defined by the arctangent of the instantaneous quotient. As will be explained below, the instantaneous quotients are actually combined with the I and Q sign bits to produce address codewords representing angles from 0 to 360 degrees. The sequence of correction factors are shown as sample sequences (D) and (E). The sequences (D) and (E) from memory element 45 are applied to a multiplexer 46 which outputs the sample sequence (J). Multiplexer 46 is controlled by a clock signal having pulses occurring at the sample rate of the I, Q samples applied to input port 32, i.e., at a rate equal to two times the color subcarrier frequency $f_{sc}$.

The I and Q samples from latches 34 and 36 are applied to delay element 48 which produces the sample sequences (F) and (G) appropriately timed so that they occur concurrently at multiplier 51 with their corresponding correction factors (D) and (E) of FIG. 3. Sequences (F) and (G) from delay element 48 are applied to the multiplexer 47 which is operated at four times the color subcarrier frequency to output the I, Q sample sequence (H). Samples from multiplexer (47) are applied to the two's complement circuit 55 which selectively inverts the polarity of particular I, Q samples to establish the desired (±) signs in equations (1) and (2). The samples from two's complement circuit 55 are applied to the multiplier 51 wherein they are multiplied by the sequence of correction factors produced by multiplexer 46. Multiplier 51 generates the sequence of products (K) which are applied to the latch 54 and to one input of adder 53. Latch 54 delays the products by one clock period, $T_i$, producing the sequence (L). The signs of the products in sequences (K) and (L) are for counter clockwise vector correction. The products output from latch 54 are applied to a second input of adder circuit 53 which produces the sequence of sums of products (M). Note the time periods in sequence (M) having an asterisk indicate that the sum produced during that sample period is a meaningless sum relative to equations (1) and (2). The output sequence provided by adder circuit 53 is demultiplexed by latches 49 and 50 to produce the corrected color mixture signals I' and Q' each comprised of the respective alternate sums of sequence (M).

The two's complement circuit 55 and its controlling circuit 56 will be included when symmetry of hue correction about the I axis allows reduction of the size of memory element 45. If, however, the memory 45 contains a unique signed correction factor for each chrominance phasor angle, the (±) signs in equations (1) and (2) will be accommodated by the sign of the correction factors. In this instance, the two's complement circuit 55 and its control logic 56 will not be included.

Refer next to FIG. 4A which is a phasor diagram showing the axes of the I and Q chrominance components and an instantaneous chrominance vector C. The intersection of the I and Q axes form four 90 degree axis with the zero angular reference being along the positive I axis. The four quadrants are divided into eight sectors 1-8 each of which encompasses a 45 degree sector. Sector 1 is defined by samples I and Q both being positive with I>Q. With Q and I samples applied to the divider as dividend and divisor, respectively, the quotients produced correspond to the tangents of angles from zero to 45 degrees. As the chrominance vector or phasor moves into sector 2, Q>I and I and Q remain positive. In sector 2, I samples are applied to the dividend input of stage 1 of the divider circuit and Q samples are applied to the divisor. As the chrominance vector translates from the 45 degree angle toward the +Q axis the quotients correspond to the tangents of angles from 45 degrees to zero degrees.

Similarly, as the chrominance phasor traverses each quadrant, the values represehted by the quotients correspond to angles from zero degrees to 45 degrees to zero degrees because only the magnitudes of the I and Q components are applied to the divider 42 and the smaller is always divided by the larger. The table of FIG. 4B indicates the sectors, the values of the chrominance phase angles $\theta$, the angles represented by the arctangents of the quotients and the sign bits of the I, Q and (Q−I) difference samples in the respective sectors.

The I, Q and (Q−I) sign bits may be combined with the quotients from the divider circuit to generate memory address codes, corresponding to angles from zero to 360 degrees. The memory 45 is programmed to respond directly to the address codes to produce correction factors for chrominance angles over the range of zero to 360 degrees. For example, assume first that the sign codes from FIG. 4B are appended to the quotients from divider 42 as the three MSB's, and that a particular binary quotient at bus 57 for an angle of 26 degrees is 10000. When the sign bits are appended the composite quotient is 00010000. The correction factors programmed at memory address location 00010000 corresponds to the correction factors for the instantaneous chrominance vector having an angle of 26 degrees. For the same quotient (57) in sector 2 the composite address is 00110000 corresponding to the angle 90−26=64 degrees. The correction factors programmed at memory address location 00110000 corresponds to the correction factors for a chrominance vector having an angle of 64 degrees. Note that if the correction factors are symmetric about the positive I axis, the Q sign bit may be eliminated from the composite address, thereby halving the memory size. Note also that if correction factors are desired for a limited range of angles e.g., ±90 degrees the memory address decoding structure can be arranged to output a "no correction" default value for the three MSB's of the address codes defined for sectors 3, 4, 5 and 6.

In the present application the memory is programmed to output two correction factors (sin $\Delta\phi$ and cos $\Delta\phi$) for the address codewords. It will be appreciated that parallel memories may be implemented—one to provide correction factors corresponding to the sine function and the other to provide correction factors corresponding to the cosine function. Alternatively, the memory may be employed to produce only the, e.g., sine correction factors, and a sine-cosine converter implemented to generate the cosine factors from the sine values. One illustrative argument function $\Delta\phi$ for auto flesh correction factors sin $\Delta\phi$ and cos $\Delta\phi$ over the range of ±90 degrees is defined $$\Delta\phi = K \sin 2\theta \qquad 0 < \theta < 90°$$
$$\text{and } -90° < \theta < 0°$$
$$\Delta\phi = 0 \qquad \text{for } 90 < \theta < 270$$

where K is a constant and $\theta$ is the chrominance angle relative to the I axis. This function applies the greatest angular correction at ±45 degrees, with the correction tending toward zero at ±90 degrees and at zero degrees.

In FIG. 2 the sign bits are decoded before application to the memory element 45. The I and Q sample sign bits from latches 34 and 36 and the sign bit (sgn) from subtraction circuit 38 are applied to delay element 40 to appropriately time the sign bits with the corresponding quotients produced on bus 57. The delayed sign bits are applied to decoder 41 which produces, for example, a two bit code that is appended to bus 57. Decoder 41 generates a further control which is applied to the control input terminal of multiplexer 44. The combination of the quotient and two bit codewords are applied to one input port of multiplexer 44 and an address from source 43 for producing a "no correction" correction factor from memory element 45 is applied to a second input port of multiplexer 44. The multiplexer, responsive to the control signal, selectively applies the combined quotient or the "no correction" address to the address input port of memory element 45.

Assume that the desired hue correction is symmetrical about the positive I axis and that no correction is desired in sectors 4 and 5. The two bit code from the decoder must define sectors (1, 8), (2, 7) and (3, 6) and the control signal must be a first state for sectors 1, 2, 3, 6, 7 and 8 and a second state for sectors 4 and 5. The control signal is determined via a simple AND function defined in Boolean terms by: control signal $= I \cdot (I-Q)$. Assume that the two bit codes to the quotients on bus 57 are to equal 00, 01 and 10 for sectors 1 and 8, 2 and 7, 3 and 6 respectively. The LSB of the two bit code may be determined from the Boolean function $I \cdot (I-Q) + I \cdot (1-Q)$ and the MSB of the two-bit code by $I \cdot (I-Q)$ which are easily realized in combinatorial logic by those skilled in the art of digital design.

If it is required to uniquely define a correction factor for all angles of the input chrominance phasor over the zero to 360 degree range the parts count can be reduced by simply appending the sign bits to the quotients and eliminating decoder 41 and multiplexer 44. However, if the correction factors follow some angularly dependent symmetry, the use of decoder 41 and multiplexer 44 may result in a smaller parts count.

Next consider a system where the correction function is to be symmetrical about the positive I axis. Instantaneous chrominance vectors, C, to the right of the $+I$ axis are to be corrected by counter clockwise rotation and instantaneous chrominance vectors to the left of the $+I$ axis are to be corrected by clockwise rotation. To realize such symmetrical correction, the memory is programmed with correction factors for chrominance angles from zero to 180 degrees. The I sign bit and the $(I-Q)$ sign bit are appended to the quotients from divider 42 and applied directly to the address input port of the memory. From FIGS. 4A and 4B it will be noted that the Q sign bit is not required to be included as part of the memory address because of the desired symmetry. The exemplary combinatorial logic circuitry 56 generates a control signal which is applied to the two's complement circuit 55 to appropriately invert or two's complement the polarity of the I, Q samples (H) to effect the desired direction of vector rotation. Reference to FIG. 3 and equations (1) and (2) indicate the samples, $I_i$, of sequence H which must be complemented to produce a counter clockwise rotation in sectors 1, 2, 3 and 4. The appropriate Ii samples occur during periods T2 and T6 when the Q samples are positive. Conversely, clockwise correction is desired in sectors 5, 6, 7 and 8 where the $Q_i$ samples are negative. For clockwise correction, the $Q_i$ samples occurring during periods T1 and T5 must be complemented. Thus, if an appropriately timed timing pulse is combined with the $Q_i$ sign bits, a control signal can be generated to selectively cause element 55 to complement the required samples for generating the desired sums of products defined by equations (1) and (2). The time periods $T_i$ are defined by the analog-to-digital sampling clock. From this sampling clock it is known how to generate four phase clocking signals in a conventional manner. Each phase has a pulse width equal to a period $T_i$ and repeats every fourth sample. Assume that a clock phase $\phi 1$ produces a pulse during sample period T1. The next successive $\phi 1$ pulses will occur during sample periods T5, T9, etc. Similarly, clock phase $\phi 2$ occurs at sample periods T2, T6, T10... Circuit 56 ANDs clock phase $\phi 1$ (C$\phi 1$) with the appropriately delayed $Q_i$ sample sign bit from latch 36 and ANDs the complement of the $Q_i$ sample sign bit with clock phase $\phi 2$ (C$\phi 2$). The output signals from the ANDing operation are combined in a logic OR gate to produce the control signal which when applied to element 55 will effectuate symmetrical vector rotation.

For symmetrical correction of the chrominance phasor about the $+I$ axis, nominally the correction factors are selected so that the corrected Q samples do not change sign. In addition, since the correction factors correspond to sines and cosines they have values less than one. Because the processing hardware cannot accommodate binary points (i.e., the equivalents of decimal points), the correction factors programmed in memory are inherently multiplied by $2^P$ where P is the number of bits used to define the magnitude of the correction factors. The multiplier is thus a P by R bit multiplier where P and R are the number of bits defining the correction factors and the I, Q samples respectively. To compensate for the $2^P$ factor by which the correction factors are multiplied the output of the multiplier 51 is divided by $2^P$, e.g., the output samples are right shifted P bit positions. This division is performed in circuit element 52.

Note, however, that if the correction values stored are two's complement eight-bit binary numbers, the maximum positive value that can be realized is actually $2^P - 1$ (127 decimal). This corresponds to a correction factor of "1", i.e., cos 0° or sin 90°. Division by $2^7$, however, produces the result $127/128 \neq 1$ which is in error by a value of 1/128th. This error by itself may not be significant, however, in digital systems such errors are frequently cumulative with errors produced elsewhere in the system to produce a total error which is significant. Consider, however, that the maximum negative magnitude represented by seven bit numbers is 128 (decimal) corresponding to a correction factor of $-1$. Division of negative 128 by $2^7$ does produce a value of $|1|$ with no error. Therefore, it is advantageous to store negative correction factors in the memory if the correction factors are all of like polarity.

If negative correction factors are stored in place of positive values in memory element 45 of FIG. 2, the negative values must be accounted for in the remaining circuitry. This may be done by two's complementing the products produced by multiplier 51 as indicated by the element 52. A second method is to design the circuitry 56 to generate control signals that complement the requisite $I_i$, $Q_i$ samples from multiplexer 47 so that the appropriate products produced by multiplier 51 are positive or negative. For the circuit 56 previously described, all that is necessary is to invert the output of the OR gate of element 56 by means of inverter 59.

FIG. 5 illustrates a pipelined divider circuit 42' which may be implemented in the FIG. 2 circuit. Element 39' corresponds to element 39 in FIG. 2. In the figure, I, Q magnitude samples are applied to switching circuit 39', which, under control of the sign signal, directs the smaller of the samples to the dividend input port of stage 1 (64) and the larger of the samples to the divisor input port. Each stage 64–66 of the divider performs a subtraction of the divisor from the applied dividend. The sign bit of the difference is used in forming a partial quotient. Each stage contributes one more bit to the partial quotients. The divisor is translated from stage to stage at the sample rate. The dividend is bit-shifted leftward one bit by each stage so that each successive subtraction produces a partial quotient related to a successively lesser significant bit position. The quotient produced by stage N is N bits wide and available at output bus 67.

Figures 6, 7:
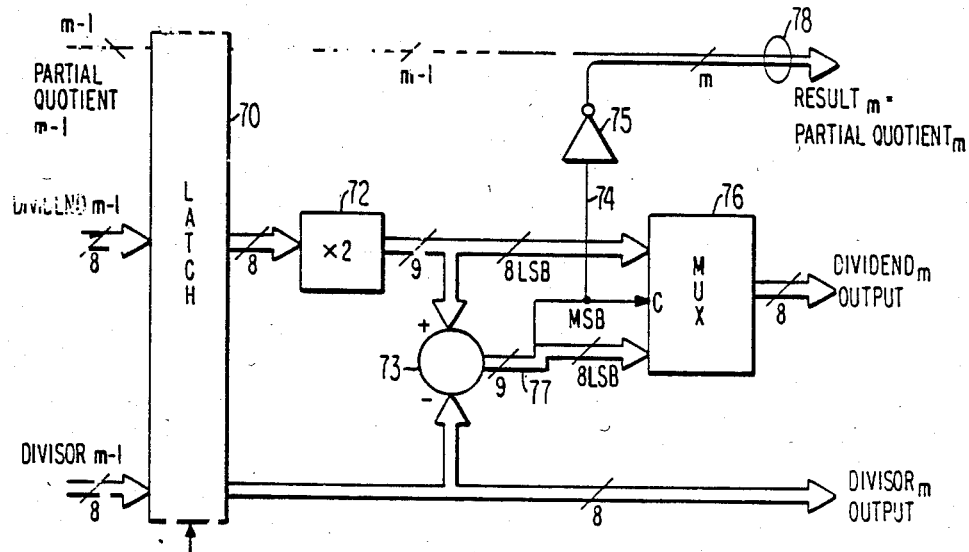

FIG. 6 illustrates the $m^{th}$ stage of the pipelined divider circuit. The stage consists of a latch circuit 70 synchronized to the sample rate by a clock signal CL. The latch stores a partial quotient of (m−1) bits from the preceding stage, a dividend value from the preceding stage and a divisor value from the preceding stage. The number of bits of the dividend and divisor applied to the input of the latch of stage m and the number of bits of the dividend and divisor output by the $m^{th}$ stage remain the same. In addition, the value of the divisor is passed from the input to the divisor$_m$ output of the stage unaltered.

The dividend from latch 70 is applied to a times-two multiplier 72 which may be a hard-wired, shift-left bit-shifter, the output of which is applied as minuend to the subtraction circuit 73. The output sample from the times-two multiplier less the MSB is applied to one input of a multiplexer 76. The divisor sample from latch 70 is applied as a subtrahend to subtraction circuit 73 and to the divisor$_m$ output port of the stage. The difference value from subtraction circuit 73 less the sign bit is applied to a second input port of multiplexer 76 and the sign bit is applied to the control input terminal of the multiplexer. For negative differences from subtraction circuit 73 the sign bit is a logic one, and responsive thereto, multiplexer 76 passes the dividend value less the MSB from the times-two multiplier to the dividend output port of the stage. For positive differences the sign bit is a logic zero and responsive to this signal multiplexer 76 passes the magnitude of the difference from subtraction circuit 73 to the dividend output port of the stage m. The sign bit from the subtraction circuit 73 is applied to an inverter 75 which inverts the bit signal. The inverted sign bit is then appended as the LSB to the (m−1) partial quotient from latch 70 to form an m-bit partial quotient (78) which is applied to the partial quotient output port of the stage.

Operation of the cascade connection of individual divider stages as separately described in conjunction with FIG. 6 is as follows. Multiplication of the dividend by two in respective elements 72 in each successive stage increases the value of the dividend by one significant digit, base 2, and the divisor is subtracted therefrom. The subtractions performed stage by stage produce negative differences until the cumulative multiplied dividend exceeds the divisor and a positive difference is developed. The number of subtractions required to generate the first positive difference establishes the most significant non zero digit in the quotient. The value of the first positive difference now becomes the dividend for succeeding stages and division by subtraction is performed on the difference in the same manner.

FIG. 7 is a table illustrating the binary values produced by the different stages of a divider having six cascaded stages for an exemplary division of binary two by binary fourteen in four bit codewords. The dividend and divisor applied to the first stage are respectively a binary two and fourteen. The quotient output by the sixth stage is 001001, which, if a decimal point is assumed to the left of the leftmost zero, equals 0.1406 and is substantially equal to 2/14=0.1403. If the decimal is assumed to the right of the rightmost digit the quotient equals (2/14) times $2^6$. All of the binary values in the table are positive magnitudes except for the values in the difference column which are in two's complement form with the leftmost bit being the sign bit.

What is claimed is:
1. In a digital video signal processing apparatus including a source of first and second binary color mixture signals, the vector sum of which contains hue information; apparatus for adjusting the hue by vector rotation, comprising:
  means coupled to said source for passing only the magnitudes of said first and second binary color mixture signals;
  a binary divider having a dividend input port, a divisor input port and a quotient output port;
  means coupled to the means for passing the magnitudes of the first and second color mixture signals for applying the larger of said signal magnitudes to one of the dividend and divisor input ports and applying the smaller of said signal magnitudes to the other of said dividend and divisor input ports; the quotients produced by said divider being constrained to correspond to tangents of angles over the range of 0–45 degrees defined by the ratio of the magnitudes of said color mixture signals;
  means responsive to the magnitudes of said first and second color mixture signals for generating a control signal having first and second states for the magnitude of said first color mixture signal being respectively greater and smaller than said second color mixture signal;
  means, responsive to said quotients, said control signal and the polarity of at least one of said first and second color mixture signals from said source, for generating first and second vector correction factors;
  means including means for multiplying said first and second color mixture signals from said source by said first and second correction factors; and
  means for combining the products of the first color mixture signal times the first correction factor and the second color mixture signal times the second correction factor to form a hue-corrected first color mixture signal and for combining the product of the second color mixture signal times the first correction factor and the first color mixture signal times the second correction factor to form a hue corrected second color mixture signal.

2. The apparatus set forth in claim 1 wherein hue correction is symmetrical about the axis of one of said first and second color mixture signals and is performed over a predetermined range of angles and the means for generating said correction factors includes:
  a decoder responsive to the polarity of the first and second color mixture signals and said control signal for generating a first further control signal having a first state over the range of angles within said predetermined range and a second state otherwise, and generating a two-bit signal having four states respectively indicative of each of four 45 degree sectors on one side of said axis of symmetry;
  a multiplexer having a first input port coupled to a default address value, a second input port coupled to said quotient output port and said two-bit signal, a control input terminal coupled to said further control signal and an output port; and
  memory means having an address input port coupled to said multiplexer output port and programmed to provide at an output port thereof said correction factors corresponding to chrominance angles represented by codewords applied to said address input port.

3. The apparatus set forth in claim 1 wherein the means for generating correction factors includes a memory programmed with values that are $2^P$ times the desired correction factor where P equals the number of bits defining the magnitude of the correction factor.

4. The apparatus set forth in claim 3 wherein the means including means for multiplying said first and second color mixture signals further includes means for dividing said products by $2^P$.

5. The apparatus set forth in claim 3 wherein said memory is programmed with all negative values of the correction factors.

6. The apparatus set forth in claim 4 wherein said memory is programmed with all negative values of the correction factors.

7. The apparatus set forth in claim 6 wherein the means including means for multiplying said first and second color mixture signals further includes means for complementing said products.

8. The apparatus set forth in claim 6 wherein the means including means for multiplying the first and second color mixture signals further includes means responsive to the polarity of at least one of said first and second color mixture signals for inverting the polarity of selective samples of said first and second color mixture signals.

9. The apparatus set forth in claim 1 wherein the means including means for multiplying the first and second color mixture signals further includes means responsive to the polarity of at least one of said first and second color mixture signals for inverting the polarity of selective samples of said first and second color mixture signals.

10. In a digital video signal processing apparatus including a source of first and second quadrature related binary sampled data color mixture signals, the vector sum of which contains hue information, apparatus for adjusting the hue by vector rotation comprising:

means responsive to the magnitudes of said first and second color mixture signals for generating sample values representing tangents corresponding to the smaller of the first and second color mixture signal divided by the larger, said sample values corresponding to tangents of angles over the range of zero to 45 degrees;

means responsive to the polarities of said first and second color mixture signals for transposing said tangent values over the range of zero to 45 degrees to values of tangents corresponding to angles over the range of at least zero to 90 degrees;

means responsive to the values of tangents corresponding to angles over the range of at least zero to 90 degrees for generating hue correction coefficients corresponding to the sines and cosines of angles whose values equal the desired vector rotation;

means including multiplying means responsive to said hue correction coefficients and the first and second color mixture signals from said source for generating products of said first and second color mixture signals times said hue correction coefficients; and means for combining the respective ones of said products to generate the sums $$S_1' = S_1 \cos \Delta\phi \pm S_2 \sin \Delta\phi$$

$$S_2' = S_2 \cos \Delta\phi \pm S_1 \sin \Delta\phi$$

where $S_1$ and $S_2$ correspond respectively to samples of said first and second color mixture signals, $S_1'$ and $S_2'$ correspond to hue corrected first and second color mixture signals and $\Delta\phi$ corresponds to a correction angle by which the vector sum is effectively rotated.

11. The apparatus set forth in claim 10 wherein the means for generating hue correction coefficients includes memory means having an address input port coupled to said tangent values and programmed to produce negative hue correction coefficients in response to tangent values applied as address codes.

12. The apparatus set forth in claim 11 wherein the means including multiplying means further includes a polarity inverting means coupled to said source of first and second color mixture signals for inverting the polarity of selected sample values of said first and second color mixture signals, said inverting means being responsive to clock timing signals and the instantaneous polarity of one of said first and second color mixture signals.

13. The apparatus set forth in claim 10 wherein the means responsive to the magnitudes of the first and second color mixture signals for generating sample values representing tangents includes:

means responsive to the first and second color mixture signals from said source for producing sample values equal to the magnitudes of said first and second color mixture signals;

means responsive to the differences of the magnitude of said first color mixture signal minus the magnitude of said second color mixture signal for generating a control signal;

means responsive to said control signal for applying the larger magnitude value of the first and second color mixture signals to a first output port and the smaller magnitude value of the first and second color mixture signals to a second output port; and a pipelined divider circuit having a dividend input port coupled to one of said first and second output ports, a divisor input port coupled to the other of said first and second output ports and having an output port at which said sample values representing tangents are available.

14. The apparatus set forth in claim 13 wherein the means for generating hue correction coefficients includes memory means having an address input port coupled to said tangent values and programmed to produce negative hue correction coefficients in response to tangent values applied as address codes.

* * * * *

UNITED STATES PATENT AND TRADEMARK OFFICE
CERTIFICATE OF CORRECTION

PATENT NO. : 4,558,351

DATED : Dec. 10, 1985

INVENTOR(S) : Russell T. Fling et al.

It is certified that error appears in the above-identified patent and that said Letters Patent is hereby corrected as shown below:

Column 3, line 43    "+" should be -- $\pm$ --.

Column 5, line 57    "represehted" should be --represented--.

Column 7, line 10    "I·(I-Q)" should be --I·$(\overline{I-Q})$--.

Column 7, lines 14 & 15    "I·(I-Q)+I·(1-Q)" should be --$\overline{I}$·(I-Q)+I·$(\overline{I-Q})$--.

Signed and Sealed this

Fourth Day of November, 1986

[SEAL]

*Attest:*

DONALD J. QUIGG

*Attesting Officer*   *Commissioner of Patents and Trademarks*